(12) United States Patent
Nagasaka et al.

(10) Patent No.: US 8,662,970 B2
(45) Date of Patent: Mar. 4, 2014

(54) AIR CONDITIONING REGISTER

(75) Inventors: Haruki Nagasaka, Kosai (JP); Hiroto Watanabe, Kiyosu (JP); Yusuke Nakano, Kosai (JP); Yasuyuki Mitsui, Kiyosu (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 705 days.

(21) Appl. No.: 12/801,138

(22) Filed: May 25, 2010

(65) Prior Publication Data

US 2010/0304655 A1    Dec. 2, 2010

(30) Foreign Application Priority Data

May 29, 2009   (JP) ................................ 2009-130631
Mar. 29, 2010  (JP) ................................ 2010-075706

(51) Int. Cl.
*B60H 1/34*    (2006.01)

(52) U.S. Cl.
USPC ........................... 454/152; 454/153; 454/155

(58) Field of Classification Search
USPC .......................................... 454/152, 153, 155
See application file for complete search history.

(56) References Cited

U.S. PATENT DOCUMENTS

| | | | | | |
|---|---|---|---|---|---|
| 3,572,233 | A | * | 3/1971 | Bar et al. | 454/154 |
| 3,811,369 | A | * | 5/1974 | Ruegg | 454/304 |
| 4,377,107 | A | * | 3/1983 | Izumi | 454/316 |
| 4,686,890 | A | * | 8/1987 | Stouffer et al. | 454/155 |
| 4,702,155 | A | * | 10/1987 | Hildebrand et al. | 454/155 |
| 5,393,262 | A | * | 2/1995 | Hashimoto et al. | 454/155 |
| 6,179,708 | B1 | * | 1/2001 | Yamamoto et al. | 454/153 |
| 6,582,293 | B1 | * | 6/2003 | Siniarski et al. | 454/155 |
| 6,800,023 | B2 | * | 10/2004 | Demerath | 454/155 |
| 6,805,624 | B2 | * | 10/2004 | Currle et al. | 454/152 |
| 7,887,400 | B2 | * | 2/2011 | Shibata et al. | 454/155 |
| 2001/0031619 | A1 | * | 10/2001 | Yabuya et al. | 454/155 |
| 2002/0178744 | A1 | * | 12/2002 | Tanabe et al. | 62/407 |
| 2004/0092224 | A1 | * | 5/2004 | Gehring et al. | 454/155 |
| 2004/0219874 | A1 | * | 11/2004 | Karadia | 454/155 |
| 2005/0245189 | A1 | * | 11/2005 | Terai et al. | 454/155 |
| 2006/0223430 | A1 | * | 10/2006 | Shibata et al. | 454/155 |

(Continued)

FOREIGN PATENT DOCUMENTS

| | | | | |
|---|---|---|---|---|
| JP | 61166718 | * | 7/1986 | |
| JP | 61166718 A | * | 7/1986 | ............... B60H 1/26 |

(Continued)

OTHER PUBLICATIONS

Office Action dated Jun. 18, 2012 in corresponding CN Application No. 201010188580.3 (and English translation).

(Continued)

*Primary Examiner* — Kang Hu
*Assistant Examiner* — Jonathan Cotov
(74) *Attorney, Agent, or Firm* — Posz Law Group, PLC

(57) ABSTRACT

An air conditioning register includes a retainer having an elongated opening, a first fin, and a plurality of second fins. The first fin is arranged along long sides of the opening at a downstream position in the retainer. The second fins are arranged along short sides at an upstream position in the retainer. The retainer includes a pair of facing inner wall surfaces corresponding to the long sides of the opening. First inclined surfaces that are continuous with the long sides of the opening and second inclined surfaces that are continuous with the first inclined surfaces through ridges are each formed in the corresponding inner wall surface of the retainer.

12 Claims, 15 Drawing Sheets

(56) References Cited

U.S. PATENT DOCUMENTS

| | | | |
|---|---|---|---|
| 2007/0232216 A1* | 10/2007 | Shibata | 454/155 |
| 2008/0081550 A1 | 4/2008 | Shibata et al. | |
| 2008/0146139 A1* | 6/2008 | Terai et al. | 454/155 |
| 2010/0130115 A1* | 5/2010 | Miki | 454/155 |

FOREIGN PATENT DOCUMENTS

| | | | |
|---|---|---|---|
| JP | 3-82209 | * | 8/1991 |
| JP | U-H03-82209 | | 8/1991 |
| JP | 05332602 | * | 12/1993 |
| JP | A-2008-149830 | | 7/2008 |
| JP | A-2009-18634 | | 1/2009 |

OTHER PUBLICATIONS

Office Action dated Dec. 21, 2012 in corresponding CN Application No. 201010188580.3.

* cited by examiner

<In the case of K1:20°, K2:27°, K3:25°, K4:25°>

⟨In the case of K1 : 30°, K2 : 27°, K3 : 25°, K4 : 25°⟩

<In the case of K1: 15°, K2: 27°, K3: 25°, K4: 25°>

⟨In the case of K1:20°, K2:35°, K3:25°, K4:25°⟩

⟨In the case K1：20°, K2：15°, K3：25°, K4：25°⟩

⟨In the case of K1 : 20°, K2 : 27°, K3 : 35°, K4 : 25°⟩

< In the case of K1 : 20°, K2 : 27°, K3 : 15°, K4 : 25° >

⟨In the case of K1 : 20°, K2 : 27°, K3 : 25°, K4 : 35°⟩

< In the case of K1 : 20°, K2 : 27°, K3 : 25°, K4 : 15° >

2

AIR CONDITIONING REGISTER

BACKGROUND OF THE INVENTION

The present invention relates to an air conditioning register, for example, for a vehicle.

An automobile such as a passenger vehicle may have a display device installed in a center cluster of the instrument panel. The display device displays instructions and conditions of a device such as a navigation system. In order to improve visibility of various types of displayed information and facilitate user operation, the size of the display device has been enlarged. However, a larger display device reduces the space for installing an air conditioning register, which is arranged at each lateral side of the display device. In this case, the air conditioning register may be arranged in an upper portion of the center cluster. To enable such arrangement, a low-profile and laterally elongated register for an air conditioner, which can be installed in a limited space, has been proposed.

As shown in FIG. 19, the "low-profile air conditioning register" described in Japanese Laid-Open Patent Publication No. 2008-149830 has a downstream-side fin set arranged in a retainer 30. A laterally elongated rectangular opening 35 is formed at the downstream end of the retainer 30. An end fin 31 and an end fin 32 of the downstream fin set are arranged in the vicinity of an upper wall portion 33 and the vicinity of a lower wall portion 34 of the retainer 30, respectively. The end fin 31 has a body portion 37 and a bent portion 39 and the end fin 32 includes a body portion 38 and a bent portion 40. The body portions 37, 38 are supported by left and right wall portions 43 each through a support shaft 36. The bent portions 39, 40 are arranged upstream from the associated body portions 37, 38 and each extend in a bent shape from an end of the body portion 37, 38. A permitting portion 44 and a permitting portion 45 are formed in the vicinity of the upper wall portion 33 and the vicinity of the lower wall portion 34, respectively. When the body portions 37, 38 incline, the corresponding permitting portions 44, 45 permit movement of the upstream ends of the bent portions 39, 40 to an upstream side of an airflow direction or in the opposite direction, with the upstream ends of the bent portions 39, 40 maintained close to the wall portions 33, 34.

The "air outlet adjustment register" disclosed in Japanese Laid-Open Patent Publication No. 2009-18634 includes a downstream-side louver and an upstream-side louver arranged in an air passage. A manipulation knob is slidably attached to a lateral fin of the downstream-side louver. By manipulating the manipulation knob, a vertical fin of the upstream-side louver is rotated to adjust the outlet direction of the air. An elongated hole through which the manipulation knob extends is formed in the lateral fin. The manipulation knob is passed through the elongated hole of the lateral fin in a manner slidable along the longitudinal direction of the lateral fin. This configuration provides a desirable outer appearance of the manipulation knob, which is inserted through the lateral fin.

As shown in FIGS. 20A and 20B, in the low-profile air conditioning register described in Japanese Laid-Open Patent Publication No. 2008-149830, the upstream ends of the bent portions 39, 40 are moved to the upstream side of the airflow direction or in the opposite direction while maintained close to the corresponding wall portions 33, 34. Accordingly, recesses 42, 42 are formed between the upstream ends of the bent portions 39, 40 and the corresponding wall portions 33, 34. However, the recesses 42, 42 may cause turbulence, which not only produces great noise but also destabilizes the direction of the air blown out of the opening 35, thus hampering the airflow direction adjustment function of the fin 41. Also, the register of Japanese Laid-Open Patent Publication No. 2008-149830 needs a mechanism for bending the bent portions 39, 40 and guiding the upstream ends of the bent portions 39, 40. This complicates the configurations of end fins 31, 32 and the configurations of the components in the vicinities of the end fins 31, 32, thus raising the manufacturing costs.

The low-profile air outlet adjustment register proposed by Japanese Laid-Open Patent Publication No. 2009-18634 has a lateral fin with improved outer appearance and simple structure. However, the register needs a component for holding the manipulation knob in a manner slidable in the elongated hole, which complicates the assembly of the components.

SUMMARY OF THE INVENTION

Accordingly, it is an objective of the present invention to provide an air conditioning register that allows effective adjustment of an air outlet direction through a simple configuration.

To achieve the foregoing objective and in accordance with one aspect of the present invention, an air conditioning register for blowing air into a passenger compartment through an opening of a retainer is provided. The register includes a pair of first inclined surfaces, a pair of second inclined surfaces, and a fin. The first inclined surfaces face each other on an inner surface of the retainer, and are continuous with the opening and inclined to widen toward the passenger compartment. The second inclined surfaces face each other at an upstream position from the first inclined surfaces. The second inclined surfaces are connected to the first inclined surfaces and inclined to narrow toward the opening of the retainer. The fin is arranged in the retainer at an upstream position from the opening. The fin is arranged in such a manner that the angle of the fin with respect to a horizontal plane is adjusted between a position at which the fin is located along one of the two second inclined surfaces and a position at which the fin is located along the other one of the second inclined surfaces.

DETAILED DESCRIPTION OF THE PREFERRED EMBODIMENTS (First Embodiment)

A first embodiment of the present invention will now be described with reference to FIGS. 1 to 14.

Figure 1:
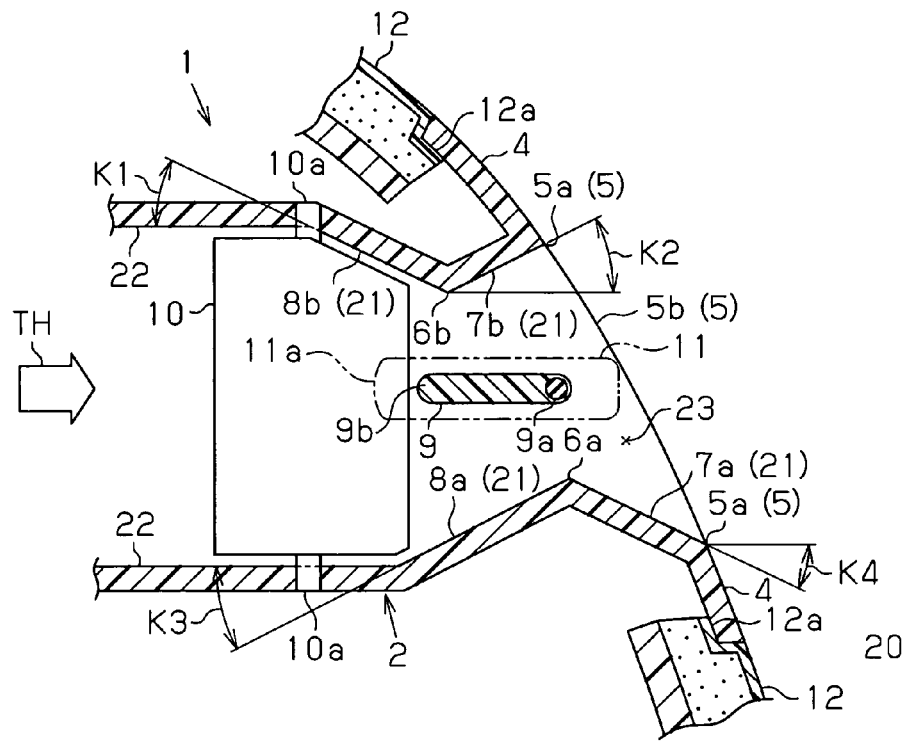
FIG. 1 is a cross-sectional view showing an air conditioning register according to a first embodiment of the present invention.

As shown in FIG. 1, an air conditioning register 1 is arranged in an upper portion of a non-illustrated center cluster. The air conditioning register 1 is located in the vicinity of the upper end of a display device, which displays various types of information regarding, for example, a navigation system. The air conditioning register 1 includes a retainer 2, which is connected to a non-illustrated duct. The retainer 2 is formed substantially by a laterally elongated rectangular tubular body. A bezel 4, which configures an ornamental surface together with an instrument panel 12, is formed in an opening 5 at another end (an end at the side corresponding to the interior of the passenger compartment) of the retainer 2. The bezel 4 is engaged with a stepped portion 12a of the instrument panel 12. The opening 5 has a rectangular shape having long sides 5a, the ratio of which to short sides 5b is great. For example, each short side 5b of the opening 5 is 30 mm and each long side 5a is 120 mm. The air conditioning register 1 is arranged in such a manner that the long sides 5a of the opening 5 are oriented in the direction of the width of the vehicle.

A lower first inclined surface 7a, an upper first inclined surface 7b, a lower second inclined surface 8a, and an upper second inclined surface 8b are formed in inner wall surfaces 21 of the retainer 2 corresponding to the long sides 5a of the opening 5. The lower second inclined surface 8a is continuous with the lower first inclined surface 7a through a ridge 6a, and the upper second inclined surface 8b is continuous with the upper first inclined surface 7b through a ridge 6b. The ridge 6a, which is located along the boundary between the lower first inclined surface 7a and the lower second inclined surface 8a, is defined as a first ridge. The ridge 6b, which is located along the boundary between the upper first inclined surface 7b and the upper second inclined surface 8b, is defined as a second ridge. The second inclined surfaces 8a, 8b are continuous with an inner body surface 22, which is arranged inward in the retainer 2. The first inclined surfaces 7a, 7b are inclined to widen toward a passenger compartment 20. The second inclined surfaces 8a, 8b are inclined toward the associated first inclined surfaces 7a, 7b in a narrowing manner. As a result, the second inclined surfaces 8a, 8b reduce the size of the passage of air A (see FIG. 2), which flows in the retainer 2.

The upper second inclined surface 8b and the lower first inclined surface 7a are arranged parallel to each other. Similarly, the upper first inclined surface 7b and the lower second inclined surface 8a are arranged parallel to each other. Hereinafter, the angle between the second inclined surface 8b and a horizontal plane is defined as an angle K1, and the angle between the first inclined surface 7b and a horizontal plane is defined as an angle K2. The angle between the second inclined surface 8a and a horizontal plane is defined as an angle K3, and the angle between the first inclined surface 7a and a horizontal plane is defined as an angle K4. In the first embodiment, the angles K1 and K4 are equal, and the angles K3 and K2 are equal.

Figure 2:
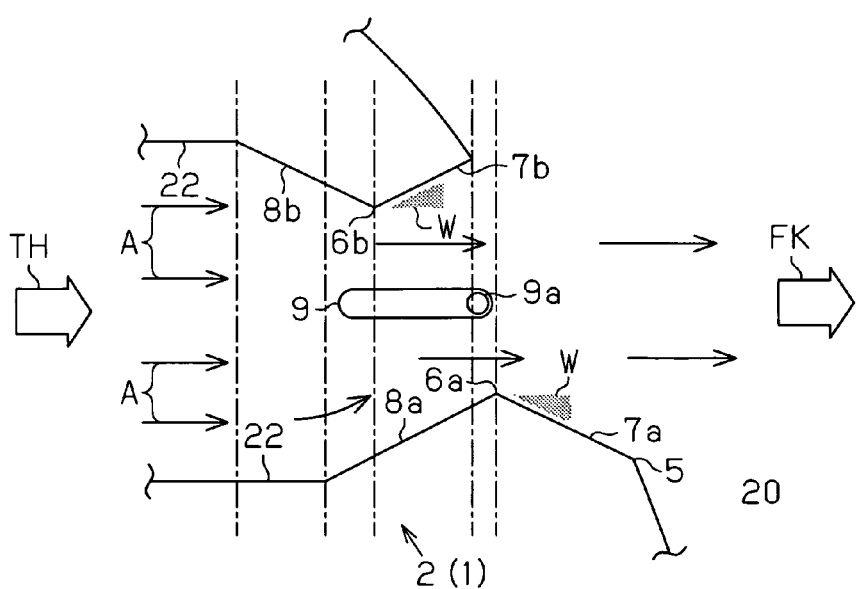
FIG. 2 is a diagram illustrating the relationship between components of the air conditioning register and an airflow direction.

With reference to FIG. 2, the beginning (the upstream end) of the upper second inclined surface 8b is located upstream from the beginning of the lower second inclined surface 8a. The upper ridge 6b is located upstream from the lower ridge 6a and faces the lower second inclined surface 8a. The lower ridge 6a is located slightly downstream from the upper first inclined surface 7b. Accordingly, the upper first inclined surface 7b faces the lower second inclined surface 8a and the lower first inclined surface 7a projects into the passenger compartment 20 compared to the upper first inclined surface 7b.

As shown in FIG. 1, a first fin 9 and a plurality of second fins 10 are arranged in the retainer 2. The first fin 9 is located upstream from the opening 5 and extends along the long sides 5a of the opening 5. The second fins 10 are located upstream from the first fin 9 and extend along the short sides 5b of the opening 5. The retainer 2 has left and right inner wall surfaces 23 facing each other. The first fin 9 is pivotally supported by the inner wall surfaces 23 through a pivot shaft 9a. The pivot shaft 9a is manipulated to adjust the angle at which the first fin 9 is oriented in an up-and-down direction, which is an airflow direction adjustment angle. The second fins 10 are supported by the upper and lower inner body surfaces 22 through a pivot shaft 10a. An upstream end portion 11a of a knob 11 is slidably attached to the first fin 9 and engaged with the second fins 10. This allows the knob 11 to slide in a left-and-right direction and adjustment of the angle at which each second fin 10 is oriented in the left-and-right direction. In the air conditioning register 1 of the first embodiment, the first fin 9 adjusts the orientation of the air A (see FIG. 2), which blows out of the opening 5, in the up-and-down direction. The second fins 10 adjust the orientation of the air A in the left-and-right direction.

In the first embodiment, the pivot shaft 9a of the first fin 9 is arranged between the ridge 6a and the ridge 6b, which is located upstream from the ridge 6a, in an airflow direction TH. An upstream end 9b of the first fin 9 is located upstream from the ridge 6b. Accordingly, the first fin 9 faces the upper first inclined surface 7b, the upper second inclined surface 8b, and the lower second inclined surface 8a.

Operation of the air conditioning register 1 of the first embodiment will hereafter be described with reference to FIG. 3.

Figure 3:
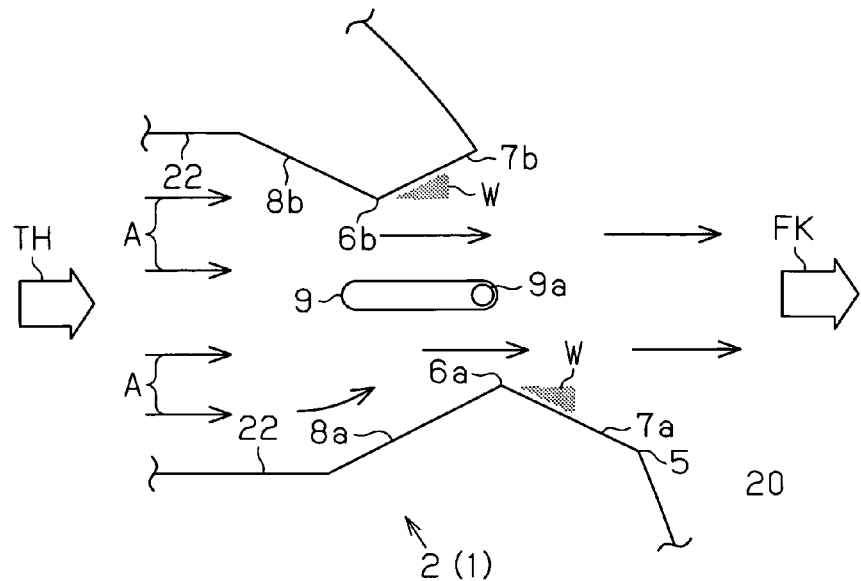
FIG. 3 is a diagram illustrating airflow when a first fin is held horizontal.

As illustrated in FIG. 3, when the first fin 9 is held horizontal, the air A flows in the retainer 2 along the airflow direction TH. The air A is guided to the first fin 9 by the narrowed second inclined surfaces 8a, 8b. Then, the flow of the air A is adjusted by the first fin 9 and, as indicated by an outlet direction FK, blown out along a horizontal direction. Specifically, although the first inclined surfaces 7a, 7b are arranged at positions downstream from the ridges 6a, 6b, there is no component that guides the air A to the first inclined surfaces 7a, 7b. The first inclined surfaces 7a, 7b are inclined to widen toward the interior of the passenger compartment 20. Accordingly, pressure for sending the air A along the first inclined surfaces 7a, 7b does not act in the areas W in the vicinities of the inclined surfaces 7a, 7b. As a result, the air A is blown out horizontally through the opening 5 by the first fin 9.

Figure 4:
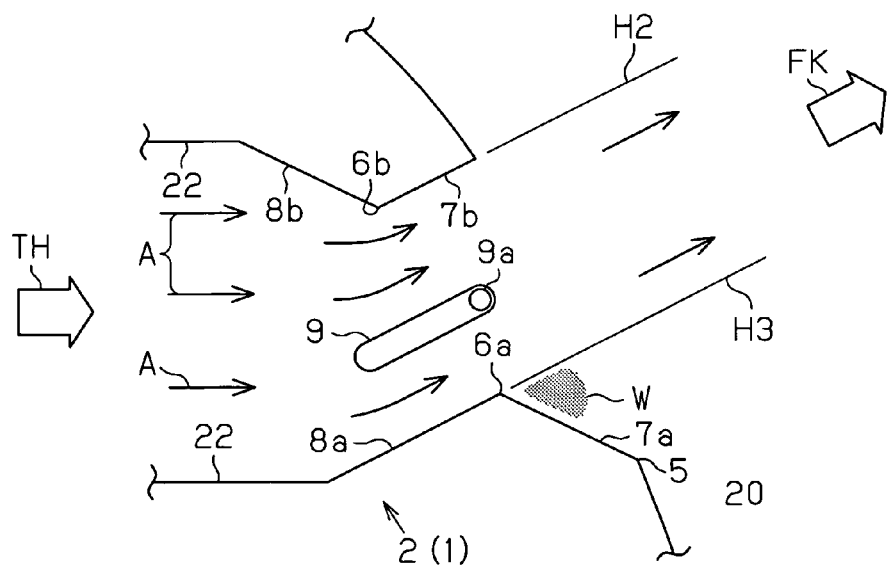
FIG. 4 is a diagram illustrating the air flow when the first fin is inclined upward in the downstream direction.

As illustrated in FIG. 4, the first fin 9 is arranged parallel to the upper first inclined surface 7b and the lower second inclined surface 8a while maintained in a state inclined upward in a downstream direction. The upper half of the air A, which flows in the retainer 2 along the airflow direction TH, is guided toward the first fin 9 by the second inclined surface 8b. The upper half of the air A is then guided by the first fin 9 and the upper first inclined surface 7b, which are parallel to each other, before being blown out of the opening 5 into the passenger compartment 20. In this state, the air A is sent diagonally upward as indicated by the outlet direction FK. The lower half of the air A, which flows in the retainer 2 along the airflow direction TH, is guided by the first fin 9 and the lower second inclined surface 8a and then blown out into the passenger compartment 20 through the opening 5. In this state, as indicated by the outlet direction FK, the air A is sent diagonally upward. As has been described, the lower first inclined surface 7a is inclined to widen toward the passenger compartment 20. Accordingly, pressure moving the blown air A along the first inclined surface 7a does not act in the area W in the vicinity of the first inclined surface 7a. As a result, the air A, which has been blown out of the opening 5, flows between a plane H2 and a plane H3, which extend downward from the upper first inclined surface 7b and the lower second inclined surface 8a, respectively. In other words, after having been blown out of the opening 5, the air A proceeds diagonally upward substantially without being diffused.

Figure 5:
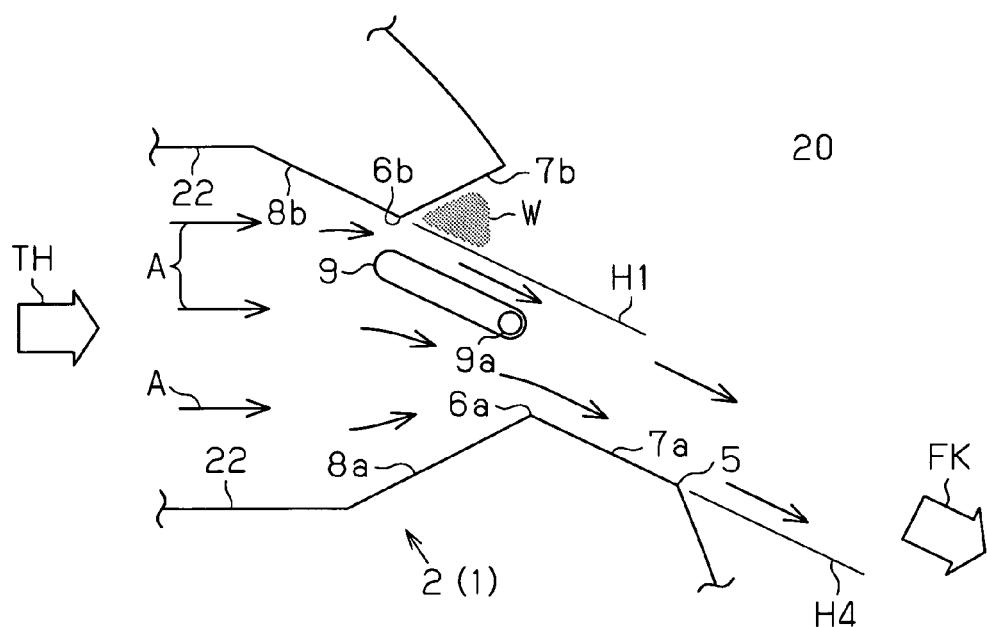
FIG. 5 is a diagram illustrating the airflow when the first fin is inclined downward in the downstream direction.

With reference to FIG. 5, the first fin 9 is arranged parallel to the lower first inclined surface 7a and the upper second inclined surface 8b while maintained in a state inclined downward in a downstream direction. The lower half of the air A, which flows in the retainer 2 along the airflow direction TH, is guided toward the first fin 9 by the lower second inclined surface 8a. Subsequently, the air A is guided by the first fin 9 and the lower first inclined surface 7a and then blown out of the opening 5 into the passenger compartment 20. In this state, the air A is sent diagonally downward as indicated by the outlet direction FK. The upper half of the air A, which flows in the retainer 2 along the airflow direction TH, is guided by the upper second inclined surface 8b and the first fin 9 and then blown out into the passenger compartment 20 through the opening 5. In this state, as indicated by the outlet direction FK, the air A is sent diagonally downward. As has been described, the upper first inclined surface 7b is inclined to widen toward the passenger compartment 20. Accordingly, pressure moving the blown air A along the first inclined surface 7b does not act in the area W in the vicinity of the first inclined surface 7b. As a result, the air A, which has been sent out through the opening 5, flows between a plane H4 and a plane H1, which extend downward from the lower first inclined surface 7a and the upper second inclined surface 8b, respectively. In other words, after having been blown out of the opening 5, the air A proceeds diagonally downward substantially without being diffused.

Using various combinations of the angles K1 to K4, a simulation was carried out to check the outlet direction FK of the air A. As a result, it was found that a preferable result was obtained by any combination that satisfied the following condition.

K1: 16° to 25°
K2: 25° to 30°
K3: 20° to 30°
K4: 20° to 30°

FIGS. 6 to 14 show the results of the simulation. FIG. 6A shows the result of the simulation in which the first fin 9 was arranged horizontal. FIG. 6B shows the result of the simulation in which the first fin 9 was inclined upward in the downstream direction. FIG. 6C shows the result of the simulation in which the first fin 9 was inclined downward in the downstream direction. FIGS. 7A to 14C show the results of the simulation similar to those shown in FIGS. 6A to 6C.

FIG. 6 shows the case in which the angles K1, K2, K3, and K4 were set to 20°, 27°, 25°, and 25°, respectively, which fall in the respective aforementioned preferable ranges.

Figure 6A:
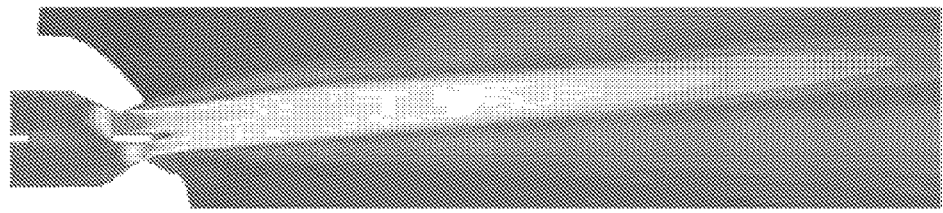
FIGS. 6A, 6B, and 6C are diagrams illustrating airflow when angles K1, K2, K3, and K4 fall in respective preferable ranges.
Figure 6B:
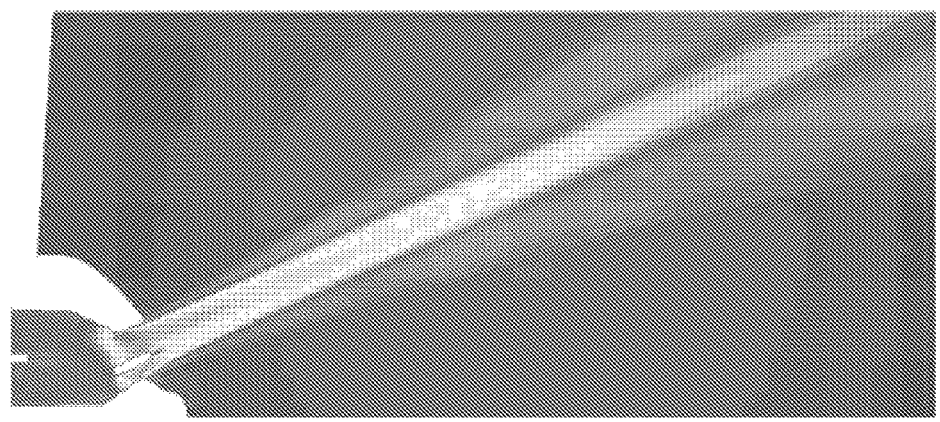
Figure 6C:
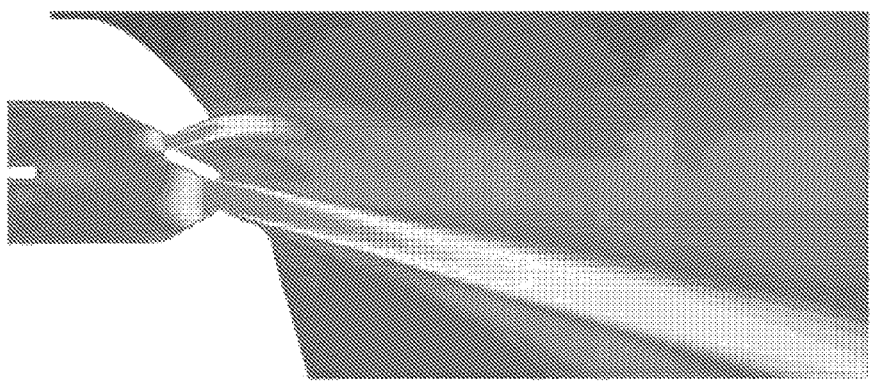

With reference to FIG. 6A, when the first fin 9 was held horizontal, the air A was blown out of the opening 5 into the passenger compartment 20 substantially in a horizontal direction substantially without being diffused. With reference to FIG. 6B, when the first fin 9 was inclined upward in the downstream direction, the air A was blown out of the opening 5 into the passenger compartment 20 diagonally upward substantially without being diffused. With reference to FIG. 6C, when the first fin 9 was inclined downward in the downstream direction, the air A was blown out of the opening 5 into the passenger compartment 20 diagonally downward without being significantly diffused.

Contrastingly, when even one of the four angles K1 to K4 did not fall in the corresponding one of the aforementioned preferable ranges, the flow of the air A in the upward or downward direction was hampered assumedly for the following reasons.

FIG. 7 shows the case in which the angles K1, K2, K3, and K4 were set to 30°, 27°, 25°, and 25°, respectively. In other words, the angles K2 to K4 were set in the respective preferable ranges but the angle K1 is set to a value greater than the corresponding preferable range.

Figure 7A:
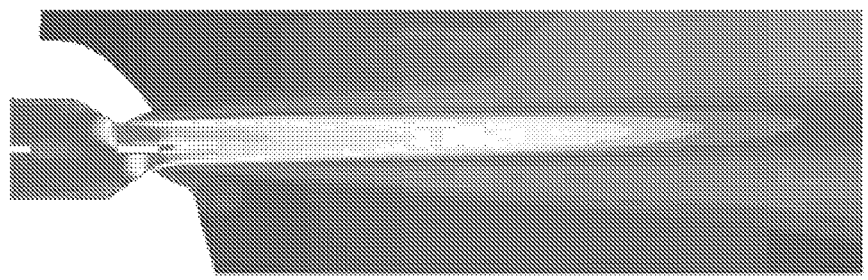
FIGS. 7A, 7B, and 7C are diagrams illustrating the airflow when the angle K1 is greater than the preferable range.
Figure 7B:
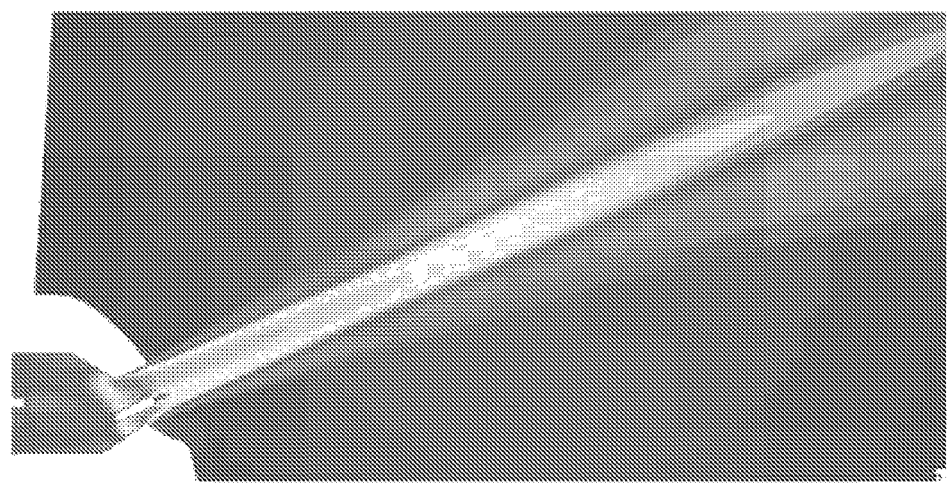

In this case, the air A was blown out in the desired direction substantially without being diffused both when the first fin 9 was held horizontal as shown in FIG. 7A and when the first fin 9 was inclined upward in the downstream direction as shown in FIG. 7B.

Figure 7C:

However, since the angle K1 was great, the interval between the first fin 9 and the upper ridge 6b was decreased when the first fin 9 was inclined downward in the downstream direction as shown in FIG. 7C. This made it difficult for the air A to flow between the first fin 9 and the upper ridge 6b. As a result, the force moving the air A along the first inclined surface 7a (a wall surface effect) became excessively great. Accordingly, after having passed through the space between the first fin 9 and the lower ridge 6a, most of the air A flowed downward along a portion located lower than the bezel 4 and the opening 5 of the instrument panel 12. In other words, the air A was prevented from proceeding in the desired diagonally downward direction.

FIG. 8 shows the case in which the angles K1, K2, K3, and K4 were set to 15°, 27°, 25°, and 25°, respectively. In other words, the angles K2 to K4 were set in the respective preferable ranges but the angle K1 was set to a value smaller than the corresponding preferable range.

Figure 8A:
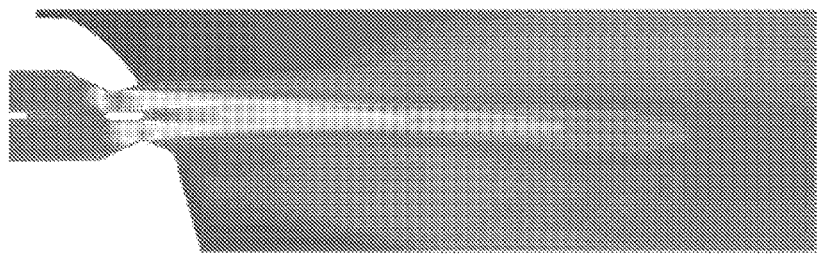
FIGS. 8A, 8B, and 8C are diagrams illustrating the airflow when the angle K1 is smaller than the preferable range.
Figure 8B:
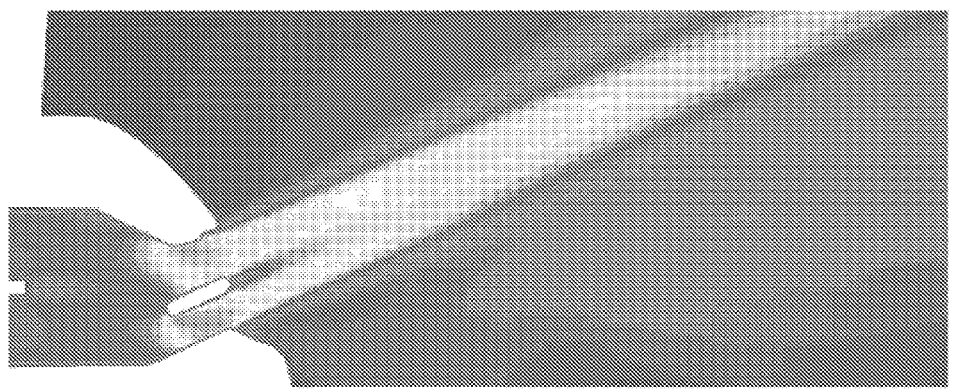

In this case, the air A was blown out in the desired direction substantially without being diffused both when the first fin 9 was held horizontal as shown in FIG. 8A and when the first fin 9 was inclined upward in the downstream direction as shown in FIG. 8B.

Figure 8C:
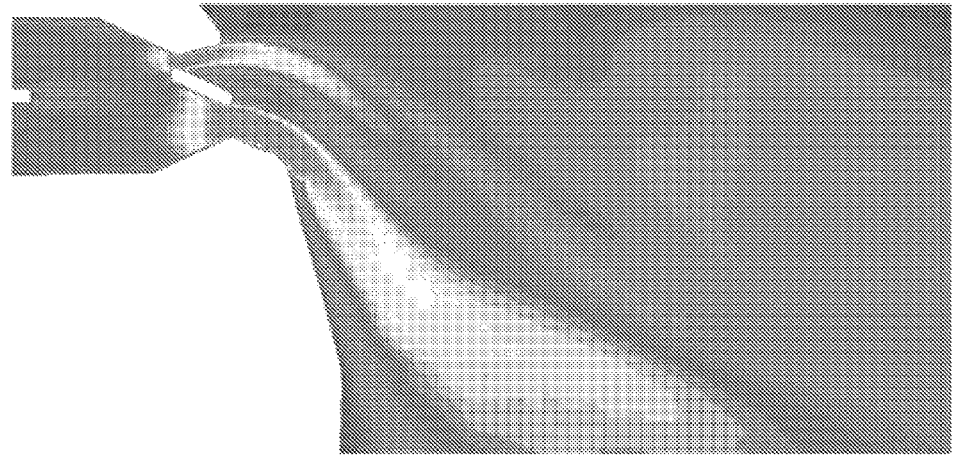

However, since the angle K1 was small, the interval between the first fin 9 and the upper ridge 6b was increased when the first fin 9 was inclined downward in the downstream direction as shown in FIG. 8C. This increases the amount of the air A that was blown out diagonally downward after having proceeded between the first fin 9 and the upper ridge 6b. The air A merged into the air A that had passed between the first fin 9 and the lower ridge 6a. Afterwards, most of the air A that had passed through the opening 5 concentrated in a diagonally downward spot. In this state, the force moving the air A along the first inclined surface 7a (the wall surface effect) was increased in the vicinity of the first inclined surface 7a. Accordingly, after having passed through the opening 5, the air A flowed downward along a portion located lower than the bezel 4 and the opening 5 of the instrument panel 12. In other words, the air A was prevented from proceeding in the desired diagonally downward direction.

FIG. 9 shows the case in which the angles K1, K2, K3, and K4 were set to 20°, 35°, 25°, and 25°, respectively. In other words, the angles K1, K3, and K4 were set in the respective preferable ranges but the angle K2 was set to a value greater than the corresponding preferable range.

Figure 9A:
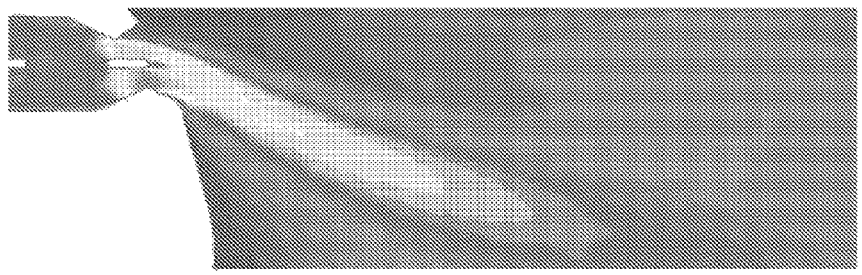
FIGS. 9A, 9B, and 9C are diagrams illustrating the airflow when the angle K2 is greater than the preferable range.
Figure 9B:
Figure 9C:
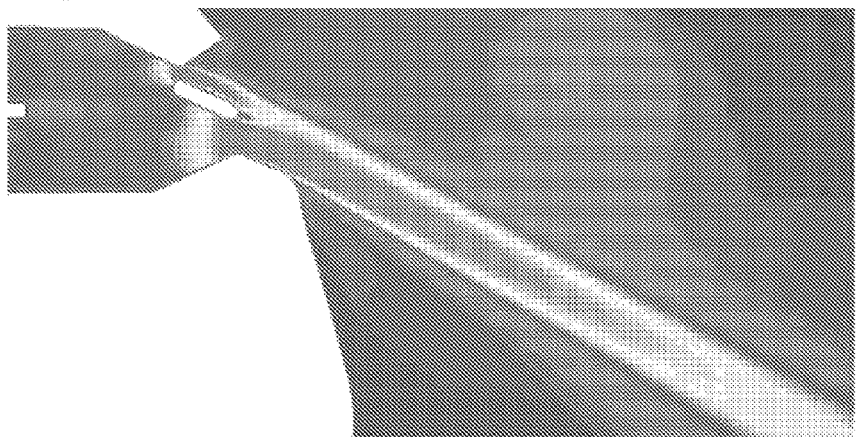

In this case, the air A was blown out in the desired direction substantially without being diffused both when the first fin 9 was inclined upward in the downstream direction as shown in FIG. 9B and when the first fin 9 was inclined downward in the downstream direction as shown in FIG. 9C.

However, since the angle K2 was great, part of the air A that was blown out from the space between the first fin 9 and the upper ridge 6b influenced the part of the air A that had passed between the first fin 9 and the lower ridge 6a when the first fin 9 was held horizontal as shown in FIG. 9A. As a result, after having passed through the opening 5, the air A was blown out slightly downward compared to the desired horizontal direction.

FIG. 10 shows the case in which the angles K1, K2, K3, and K4 were set to 20°, 15°, 25°, and 25°, respectively. In other words, although the angles K1, K3, and K4 were set in the respective aforementioned preferable ranges, the angle K2 was set to a value smaller than the corresponding preferable range.

Figure 10A:
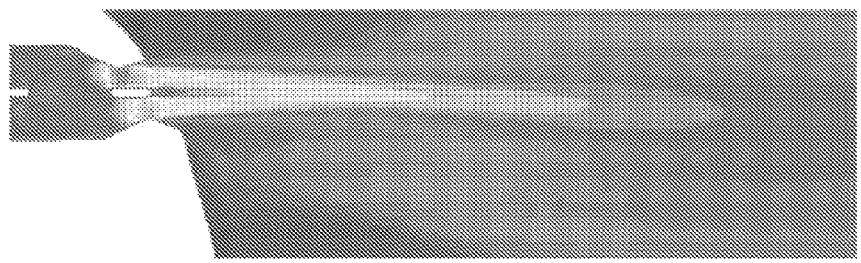
FIGS. 10A, 10B, and 10C are diagrams illustrating the airflow when the angle K2 is smaller than the preferable range.
Figure 10B:
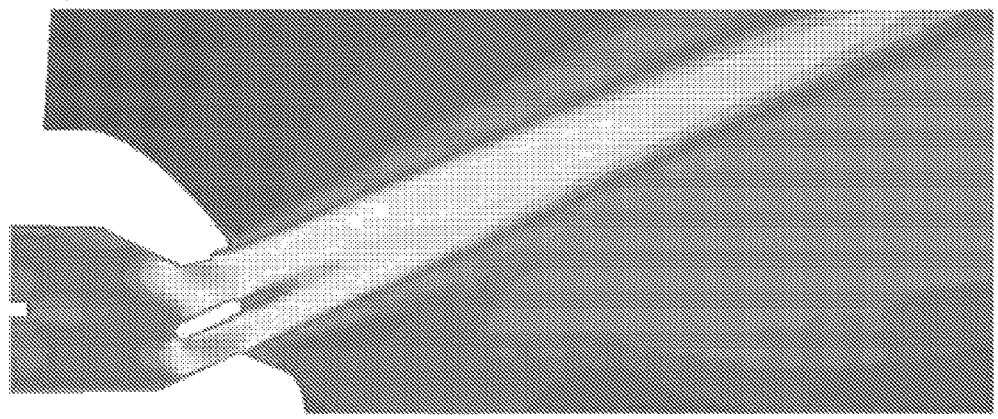

In this case, both when the first fin 9 was held horizontal as shown in FIG. 10A and when the first fin 9 was inclined upward in the downstream direction as shown in FIG. 10B, the air A was blown out in the desired direction substantially without being diffused.

Figure 10C:
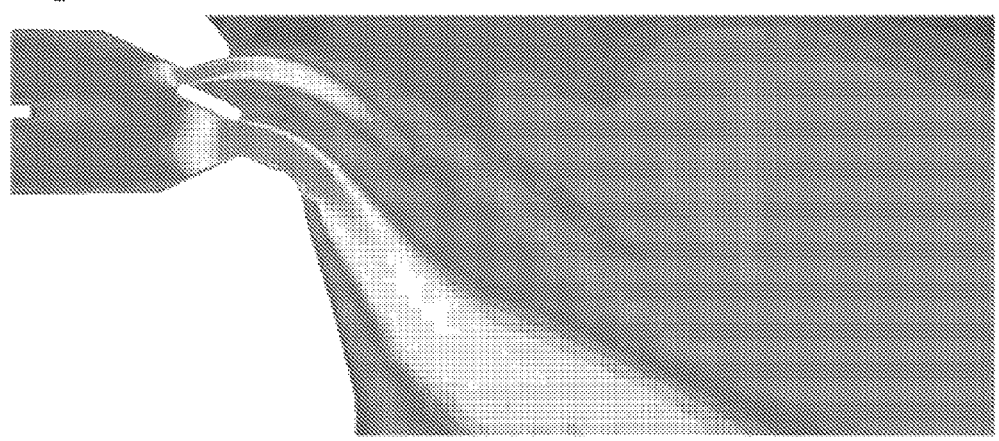

However, since the angle K2 is small, the force moving the air A along the first inclined surface 7b (the wall surface effect) increased in the vicinity of the first inclined surface 7b when the first fin 9 was inclined downward in the downstream direction as shown in FIG. 10C. This caused the part of the air A that had passed between the first fin 9 and the upper ridge 6b to flow along the first inclined surface 7b and influenced the part of the air A that had passed between the first fin 9 and the lower ridge 6a. As a result, the air A was diffused after having been blown out of the opening 5 and did not proceed in the desired diagonally downward direction.

FIG. 11 shows the case in which the angles K1, K2, K3, and K4 were set to 20°, 27°, 35°, and 25°, respectively. In other words, although the angles K1, K2, and K4 were set in the respective aforementioned preferable ranges, the angle K3 was set to a value greater than the corresponding preferable range.

Figure 11A:
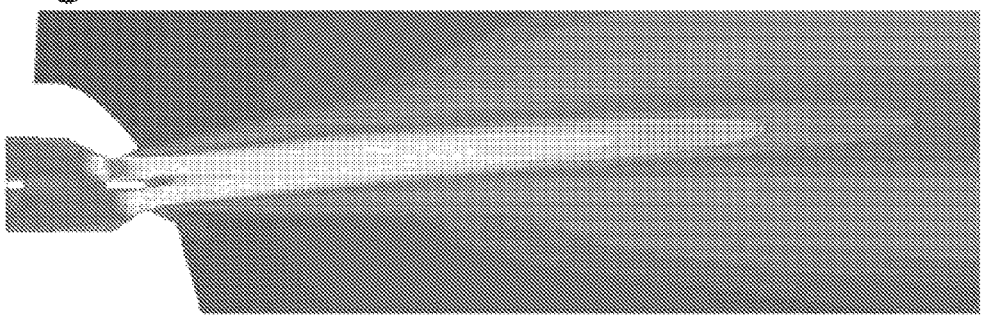
FIGS. 11A, 11B, and 11C are diagrams illustrating the airflow when the angle K3 is greater than the preferable range.
Figure 11B:
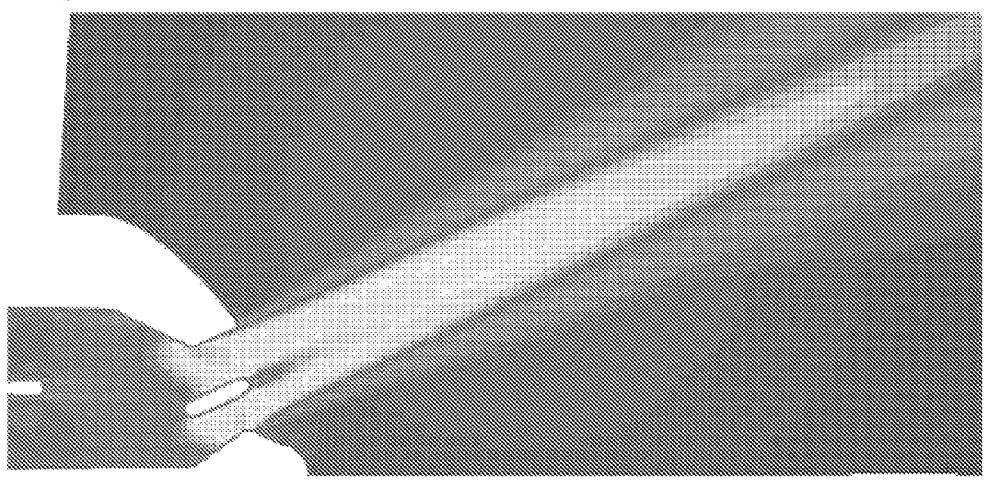

In this case, when the first fin 9 was inclined upward in the downstream direction as shown in FIG. 11B, the air A was blown out diagonally upward as desired substantially without being diffused.

However, since the angle K3 was great, the part of the air A that would flow diagonally upward along the lower second inclined surface 8a influenced the part of the air A that would proceed horizontally along the first fin 9 when the first fin 9 was held horizontal as shown in FIG. 11A. As a result, the air A was blown out slightly upward with respect to the desired horizontal direction.

Figure 11C:
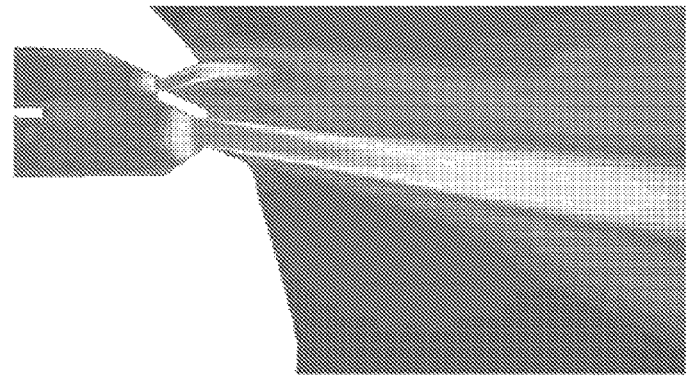

Further, since the angle K3 was great, the interval between the first fin 9 and the lower ridge 6a was decreased when the first fin 9 was inclined downward in the downstream direction as shown in FIG. 11C. The force moving the air A along the first inclined surface 7a (the wall surface effect) thus became insufficient in the vicinity of the first inclined surface 7a. Accordingly, the air A was blown out not in the desired diagonally downward direction but in an upward direction compared to the desired direction.

FIG. 12 shows the case in which the angles K1, K2, K3, and K4 were set to 20°, 27°, 15°, and 25°, respectively. In other words, although the angles K1, K2, and K4 were set in the respective aforementioned preferable ranges, the angle K3 was set to a value smaller than the corresponding preferable range.

Figure 12A:
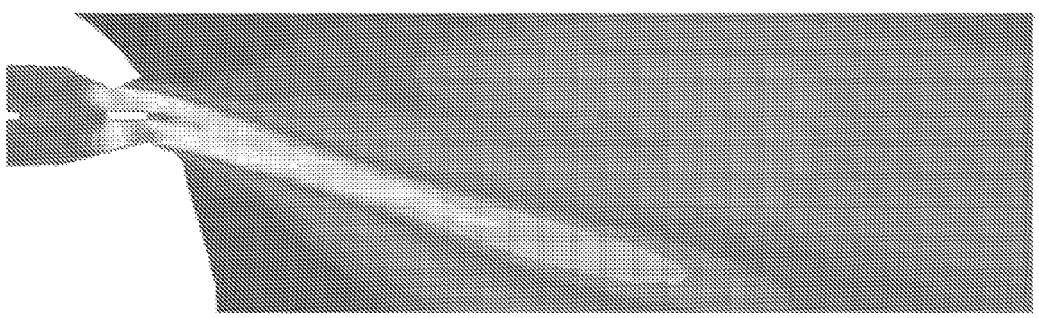
FIGS. 12A, 12B, and 12C are diagrams illustrating the airflow when the angle K3 is smaller than the preferable range.
Figure 12B:
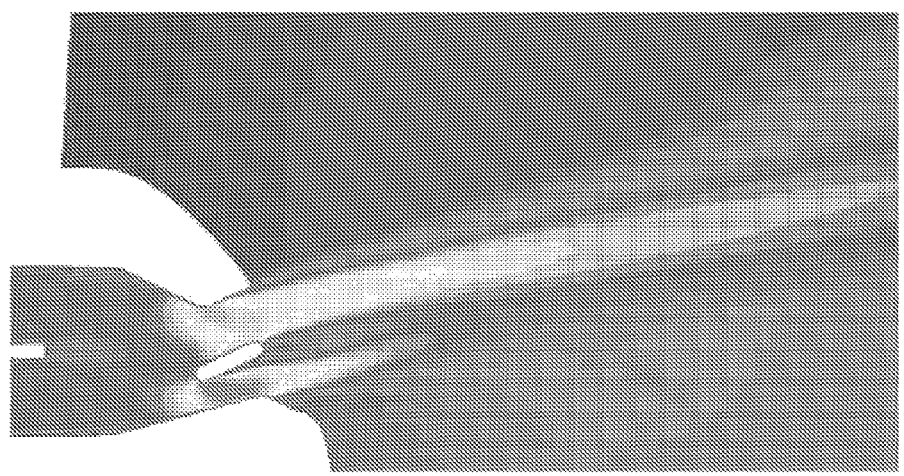
Figure 12C:
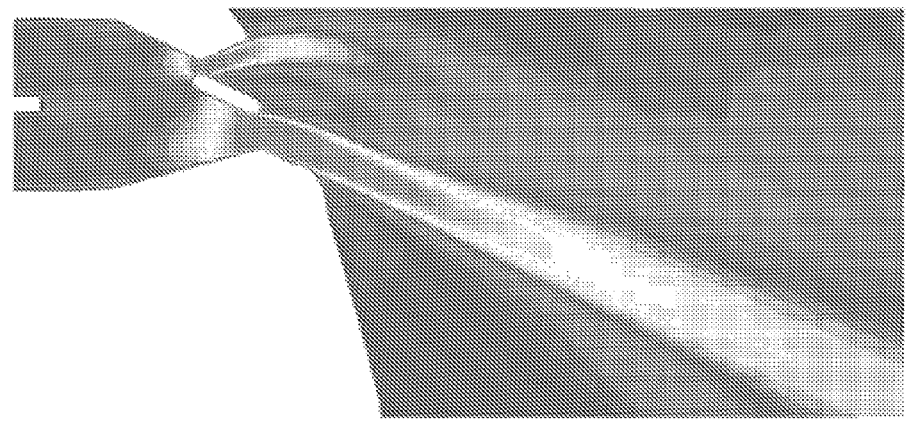

In this case, when the first fin 9 was inclined downward in the downstream direction as shown in FIG. 12C, the air A was blown out diagonally downward as desired.

However, since the angle K3 was small, the part of the air A that would flow diagonally upward along the lower second inclined surface 8a proceeded between the first fin 9 and the second inclined surface 8a without hitting the first fin 9 when the first fin 9 was held horizontal as shown in FIG. 12A. The air A was thus influenced by the force moving the air A along the first inclined surface 7a (the wall surface effect) in the vicinity of the first inclined surface 7a. This prevented the air A from being blown out of the opening 5 in the desired horizontal direction but allowed the air A to be blown in a slightly diagonally downward direction compared to the desired direction.

When the first fin 9 was inclined upward in the downstream direction as shown in FIG. 12B, the air A was also influenced by the wall surface effect as in the case of the above-described case. Specifically, the air A was blown out of the opening 5 not in the desired diagonally upward direction but in a slightly downward direction compared to the desired direction.

FIG. 13 shows the case in which the angles K1, K2, K3, and K4 were set to 20°, 27°, 25°, and 35°, respectively. In other words, although the angles K1 to K3 were set in the respective aforementioned preferable ranges, the angle K4 was set to a value greater than the corresponding preferable range.

Figure 13A:
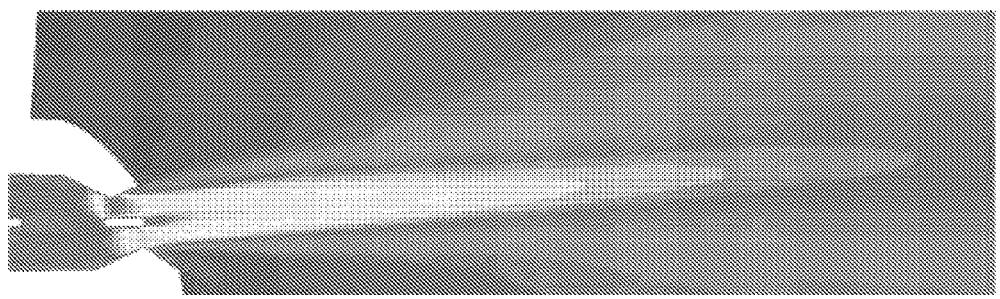
FIGS. 13A, 13B, and 13C are diagrams illustrating the airflow when the angle K4 is greater than the preferable range.
Figure 13B:

In this case, both when the first fin 9 was held horizontal as shown in FIG. 13A and when the first fin 9 was inclined upward in the downstream direction as shown in FIG. 13B, the air A was blown out in the desired direction substantially without being diffused.

Figure 13C:
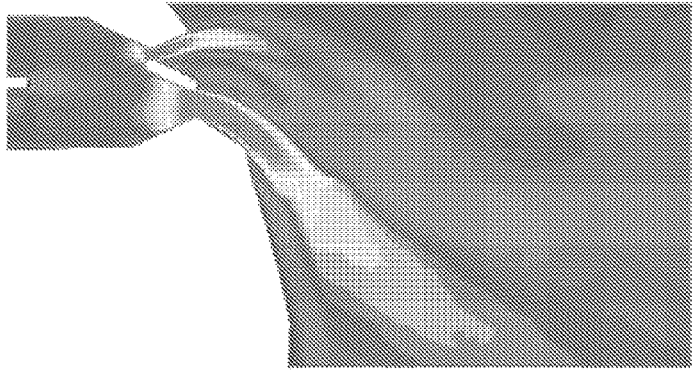

However, since the angle K4 was great, the force moving the air A along the first inclined surface 7a (the wall surface effect) increased in the vicinity of the first inclined surface 7a when the first fin 9 was inclined downward in the downstream direction as shown in FIG. 13C. As a result, the air A was diffused without being blown out of the opening 5 in the desired diagonally downward direction.

FIG. 14 shows the case in which the angles K1, K2, K3, and K4 were set to 20°, 27°, 25°, and 15°, respectively. In other words, although the angles K1 to K3 were set in the respective aforementioned preferable ranges, the angle K4 was set to a value smaller than the corresponding preferable range.

Figure 14A:
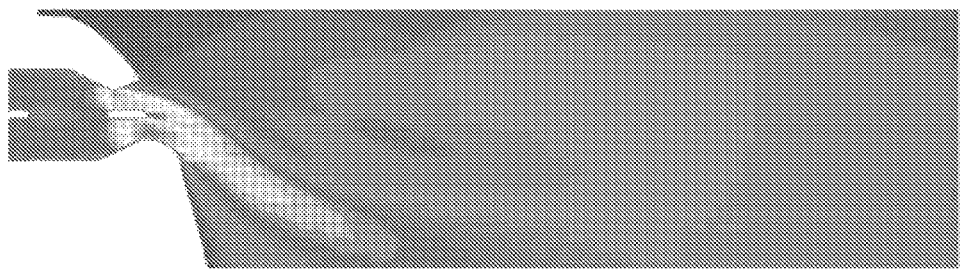
FIGS. 14A, 14B, and 14C are diagrams illustrating the airflow when the angle K4 is smaller than the preferable range.
Figure 14B:
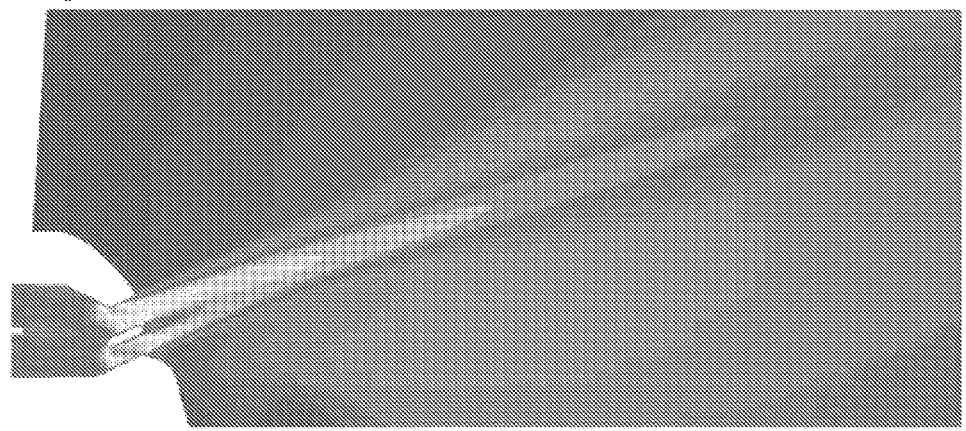
Figure 14C:
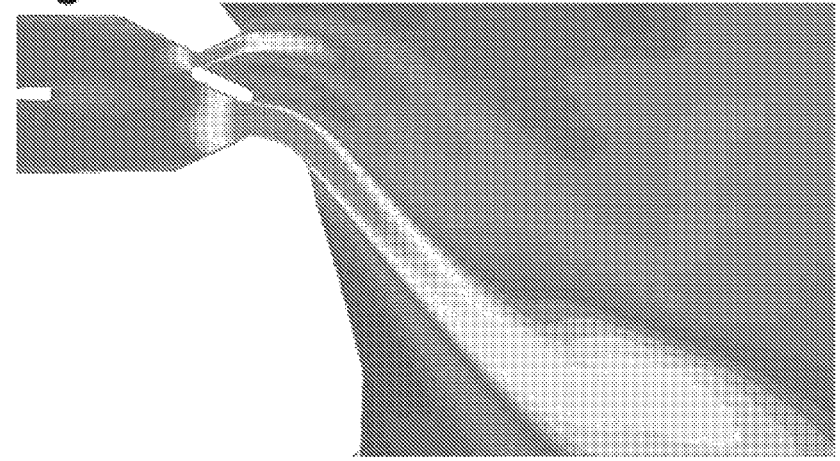

In this case, both when the first fin 9 was inclined upward in the downstream direction as shown in FIG. 14B and when the first fin 9 was inclined downward in the downstream direction as shown in FIG. 14C, the air A was blown out substantially in the desired direction without being significantly diffused.

However, since the angle K4 was small, the force moving the air A along the first inclined surface 7a (the wall surface effect) increased in the vicinity of the first inclined surface 7a when the first fin 9 was held horizontal as shown in FIG. 14A. As a result, the air A was blown out of the opening 5 not in the desired horizontal direction but in a diagonally downward direction.

Accordingly, the first embodiment has the following advantages.

(1) The inner wall surfaces 21 of the retainer 2 close to the opening 5 include the corresponding lower and upper first inclined surfaces 7a, 7b and the associated lower and upper second inclined surfaces 8a, 8b, which are continuous with the first inclined surfaces 7a, 7b through the ridges 6a, 6b. In this configuration, even though there is only one first fin 9, the direction (the outlet direction FK) of the air A that is blown out of the opening 5 is effectively adjusted by pivoting the first fin 9 and arranging the first fin 9 parallel to the second inclined surface 8a (or 8b).

(2) By means of the single first fin 9, the up-and-down direction of the air A that is blown out of the opening 5 is effectively adjusted. Accordingly, no other movable component than the first fin 9 is necessary for adjusting the outlet direction of the air A. This decreases the number of the components and simplifies the configuration.

(3) The first inclined surface 7a (or 7b) and the second inclined surface 8a (or 8b) are continuous with each other through the ridge 6a (or 6b). The second inclined surfaces 8a, 8b are continuous with the inner wall surface of the retainer 2 at the upstream side. Accordingly, unlike the configuration disclosed in Japanese Laid-Open Patent Publication No. 2008-149830, it is unnecessary to form a recess in the passages of the air A. This prevents generation of turbulence, allowing low-noise and effective air conditioning without destabilizing air blow.

(4) Among the first inclined surfaces 7a, 7b and the second inclined surfaces 8a, 8b, which configure the corresponding inner wall surfaces 21, the second inclined surface 8a and the first inclined surface 7b are arranged parallel to each other and the second inclined surface 8b and the first inclined surface 7a are arranged parallel to each other. Accordingly, the air A flowing along the second inclined surface 8a is allowed to proceed along the first inclined surface 7b by being guided by the first fin 9 inclined in the same direction as the second inclined surface 8a. Also, the air A flowing along the second inclined surface 8b is allowed to proceed along the first inclined surface 7a by being guided by the first fin 9 inclined in the same direction as the second inclined surface 8b. As a result, the direction of the air A that is blown out of the opening 5 into the passenger compartment 20 is adjusted further effectively.

(5) The first fin 9 is supported pivotally between the position at which the first fin 9 is arranged along the first inclined surface 7a and the position at which the first fin 9 is arranged along the first inclined surface 7b. In this manner, the pivot range of the first fin 9 is limited to such a range that the outlet direction of the air A is effectively adjustable. As a result, by pivoting the first fin 9, the direction of the air A that is sent out of the opening 5 is easily adjusted.

(6) The air conditioning register 1 is arranged with each long side 5a of the opening 5 oriented in the direction of the width of the vehicle. This allows the air conditioning register 1 to be arranged at such a position that has a space limited in the up-and-down direction, such as a position above the display device mounted in the center cluster of the instrument panel 12 or a position at the boundary between the ceiling and a side surface portion of the passenger compartment 20. Further, the air conditioning register 1 capable of adjusting the air outlet direction in the up-and-down direction is provided.

(7) The pivot shaft 9a, which pivotally supports the first fin 9, is arranged between the two ridges 6a, 6b in the airflow direction TH. Accordingly, the second inclined surface 8a (8b) of one of the inner wall surfaces 21, the first fin 9, and the first inclined surface 7b (7a) of the other one of the inner wall surfaces 21 are allowed to guide the air A along the respective surfaces. This prevents generation of turbulence in the air A that is blown out.

If the pivot shaft 9a is arranged at an upstream position outside the zone between the ridges 6a and 6b, the air A guided by the second inclined surface 8a (8b) of one of the inner wall surfaces 21 and the first fin 9 is likely to merge into the air A guided by the second inclined surface 8b (8a) of the other one of the inner wall surfaces 21, thus causing turbulence in the air A. If the pivot shaft 9a is located at a downstream position outside the zone between the ridges 6a, 6b, the path of the air A guided between the first fin 9 and the second inclined surface 8a (8b), which is arranged along the first fin 9, is restricted to a narrow range.

(Second Embodiment)

A second embodiment of the present invention will hereafter be described with reference to FIG. 15.

Figure 15:
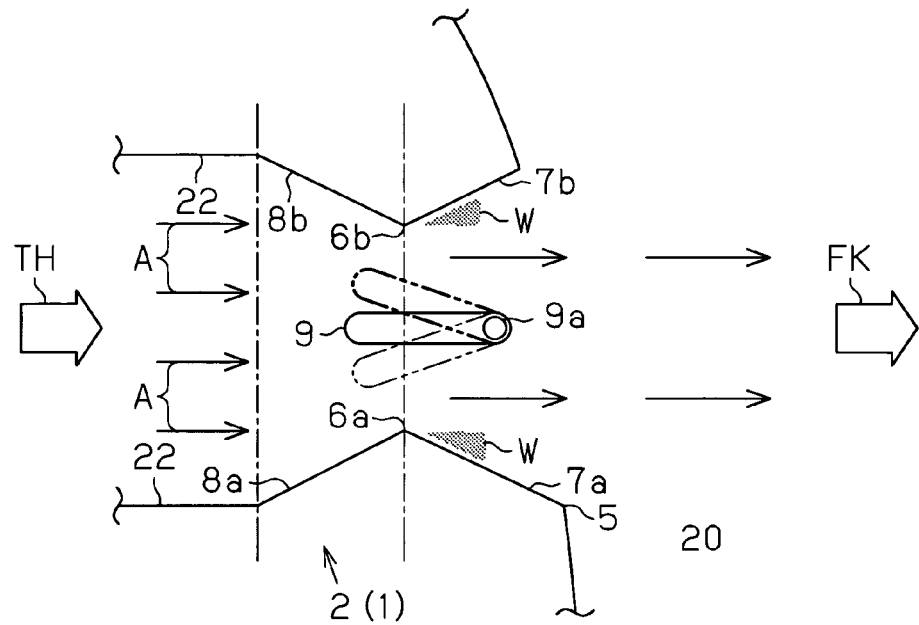
FIG. 15 is a diagram illustrating operation of a second embodiment having upper and lower ridges facing each other at the same position in the airflow direction.

As illustrated in FIG. 15, the ridges 6a, 6b face each other at the same position in the airflow direction TH of the air A. The first fin 9 is arranged at a position corresponding to the first inclined surfaces 7a, 7b and the second inclined surfaces 8a, 8b. The pivot shaft 9a is located between the first inclined surfaces 7a, 7b.

In the air conditioning register 1 of the second embodiment, when the first fin 9 is held horizontal as indicated by the solid line in FIG. 15, the air A flowing in the retainer 2 along the airflow direction TH proceeds in the same manner as the first embodiment. Specifically, after being guided by the second inclined surfaces 8a, 8b toward the first fin 9, the flow of the air A is adjusted by the first fin 9. The air A is then blown out of the opening 5 into the passenger compartment 20 in the horizontal direction as indicated by the outlet direction FK.

When the first fin 9 is inclined upward in the downstream direction as indicated by the fine double-dotted chain line in FIG. 15, the first fin 9 is arranged parallel to the upper first inclined surface 7b and the lower second inclined surface 8a. The upper half of the air A flowing in the retainer 2 along the airflow direction TH is guided by the upper second inclined surface 8b toward the first fin 9 and then by the first fin 9 and the upper first inclined surface 7b. The air A is thus blown out of the opening 5 into the passenger compartment 20 in a diagonally upward direction. The lower half of the air A proceeding in the retainer 2 along the airflow direction TH is guided by the first fin 9 and the lower second inclined surface 8a and then blown out of the opening 5 into the passenger compartment 20 in the diagonally upward direction.

When the first fin 9 is inclined downward in the downstream direction as indicated by the bold double-dotted chain line in FIG. 15, the first fin 9 is arranged parallel to the lower first inclined surface 7a and the upper second inclined surface 8b. The lower half of the air A flowing in the retainer 2 along the airflow direction TH is guided by the lower second inclined surface 8a toward the first fin 9 and then by the first fin 9 and the lower first inclined surface 7a. The air A is thus blown out of the opening 5 into the passenger compartment 20 in a diagonally downward direction. The upper half of the air A proceeding in the retainer 2 along the airflow direction TH is guided by the upper second inclined surface 8b and the first fin 9, and then blown out of the opening 5 into the passenger compartment 20 in the diagonally downward direction.

In either one of the above-described cases, the first inclined surfaces 7a, 7b are inclined to widen toward the passenger compartment 20. Accordingly, pressure moving the blown air A along the first inclined surfaces 7a, 7b does not act in the areas W in the vicinities of the inclined surfaces 7a, 7b. As a result, after having passed through the opening 5, the air A is blown out in the respective desired directions, such as the horizontal direction, the diagonally upward direction, and the diagonally downward direction, in correspondence with the angle of the first fin 9.

Accordingly, the same advantages as those of the first embodiment are achieved also in the second embodiment.

(Third Embodiment)

A third embodiment of the present invention will now be described with reference to FIG. 16.

Figure 16:
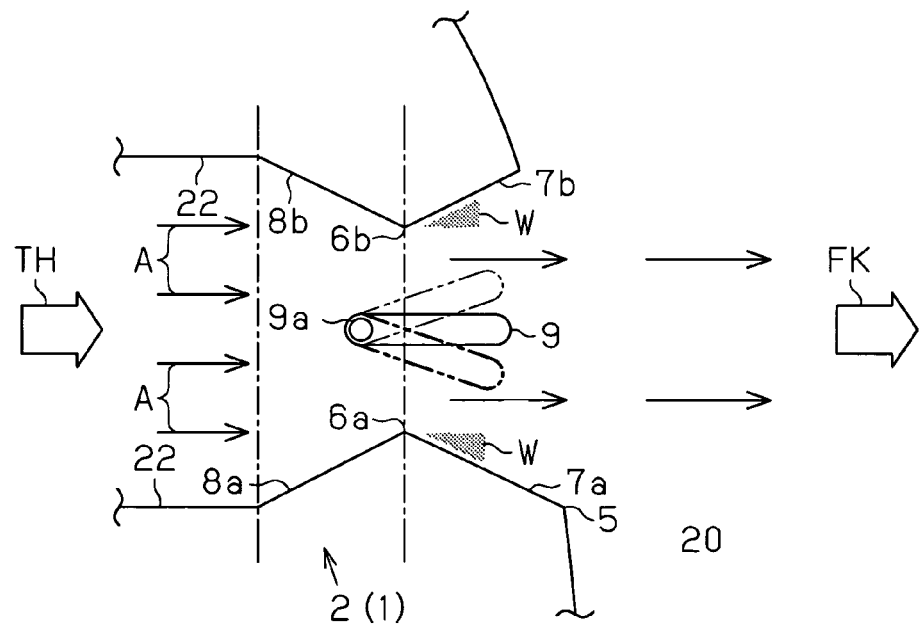
FIG. 16 is a diagram illustrating operation of a third embodiment having upper and lower ridges facing each other at the same position in the airflow direction.

In the third embodiment, as illustrated in FIG. 16, the ridges 6a, 6b face each other at the same position in the airflow direction TH of the air A, like the second embodiment. The first fin 9 is arranged at a position corresponding to the first inclined surfaces 7a, 7b and the second inclined surfaces 8a, 8b. The pivot shaft 9a is located between the second inclined surfaces 8a, 8b.

In the third embodiment, the first fin 9 is arranged selectively at the position at which the first fin 9 is held horizontal as indicated by the solid line in FIG. 16, the inclined position at which the first fin 9 is located parallel to the first inclined surface 7b and the second inclined surface 8a as indicated by the fine double-dotted line in the drawing, and the inclined position at which the first fin 9 is located parallel to the first inclined surface 7a and the second inclined surface 8b as indicated by the bold double-dotted line in the drawing. Accordingly, the third embodiment achieves the same advantages as those of the second embodiment.

(Fourth Embodiment)

A fourth embodiment of the present invention will now be described with reference to FIG. 17.

Figure 17:
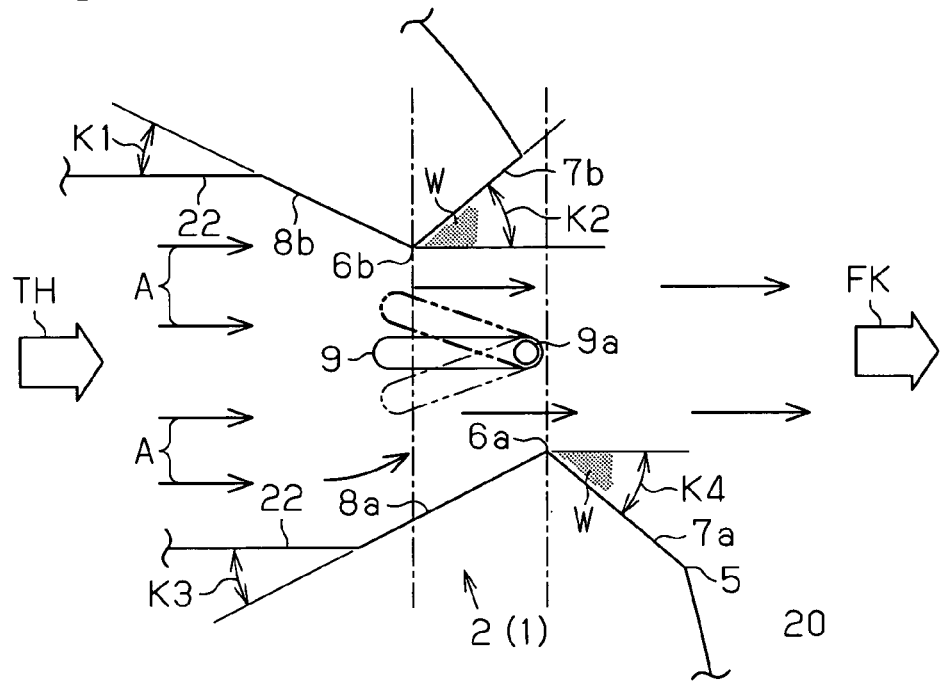
FIG. 17 is a diagram illustrating operation of a fourth embodiment having widening upper and lower first inclined surfaces.

The fourth embodiment is the same as the first embodiment except that, as illustrated in FIG. 17, the angles K2 and K4 formed by the first inclined surfaces 7b and 7b, respectively, which are close to the opening 5, with respect to horizontal planes are greater than the angles K1 and K3 formed by the second inclined surfaces 8b and 8a, respectively, which are spaced from the opening 5, with respect to horizontal planes.

When the first fin 9 is inclined upward in the downstream direction as indicated by the fine double-dotted chain line in FIG. 17, the first fin 9 is arranged substantially parallel to the lower second inclined surface 8a and the upper first inclined surface 7b. Accordingly, the upper half of the air A flowing in the retainer 2 along the airflow direction TH is guided by the upper second inclined surface 8b toward the first fin 9 and then by the first fin 9 and the upper first inclined surface 7b. The air A is thus blown out of the opening 5 into the passenger compartment 20 in a diagonally upward direction. The lower half of the air A proceeding in the retainer 2 is guided by the first fin 9 and the second inclined surface 8a and then blown out of the opening 5 into the passenger compartment 20 in the diagonally upward direction.

When the first fin 9 is inclined downward in the downstream direction as indicated by the bold double-dotted chain line in FIG. 17, the first fin 9 is arranged substantially parallel to the lower first inclined surface 7a and the upper second inclined surface 8b. Accordingly, the lower half of the air A flowing in the retainer 2 along the airflow direction TH is guided by the lower second inclined surface 8a toward the first fin 9 and then by the first fin 9 and the lower first inclined surface 7a. The air A is thus blown out of the opening 5 into the passenger compartment 20 in a diagonally downward direction. The upper half of the air A proceeding in the retainer 2 along the airflow direction TH is guided by the upper second inclined surface 8b and the first fin 9 and then blown out of the opening 5 into the passenger compartment 20 in the diagonally downward direction.

In either one of the above-described cases, the first inclined surfaces 7a, 7b are inclined to greatly widen toward the passenger compartment 20. Accordingly, pressure moving the blown air A along the first inclined surfaces 7a, 7b does not act in the areas W in the vicinities of the first inclined surfaces 7a, 7b. Accordingly, even though the angles K2, K4 of the first inclined surfaces 7b, 7a are great, the air A is blown out of the opening 5 in the respective desired directions, such as the horizontal direction, the diagonally upward direction, and the diagonally downward direction, in correspondence with the angle of the first fin 9, without generating turbulence.

(Fifth Embodiment)

Figure 18:
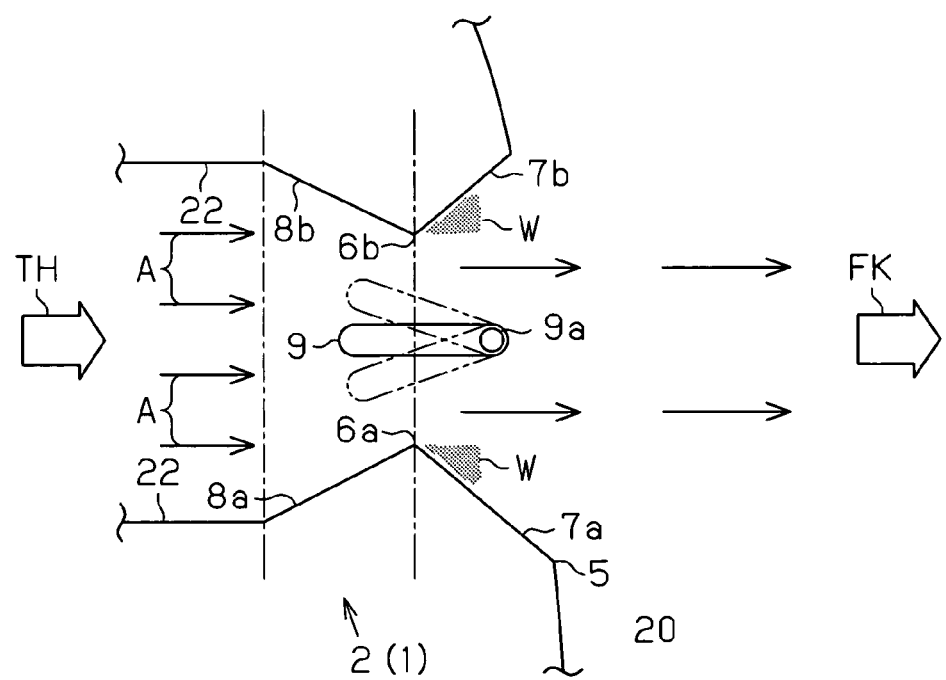
FIG. 18 is a diagram illustrating operation of a fifth embodiment that has widening upper and lower first inclined surfaces and ridges facing each other at the same position of an airflow direction.
Figure 19:
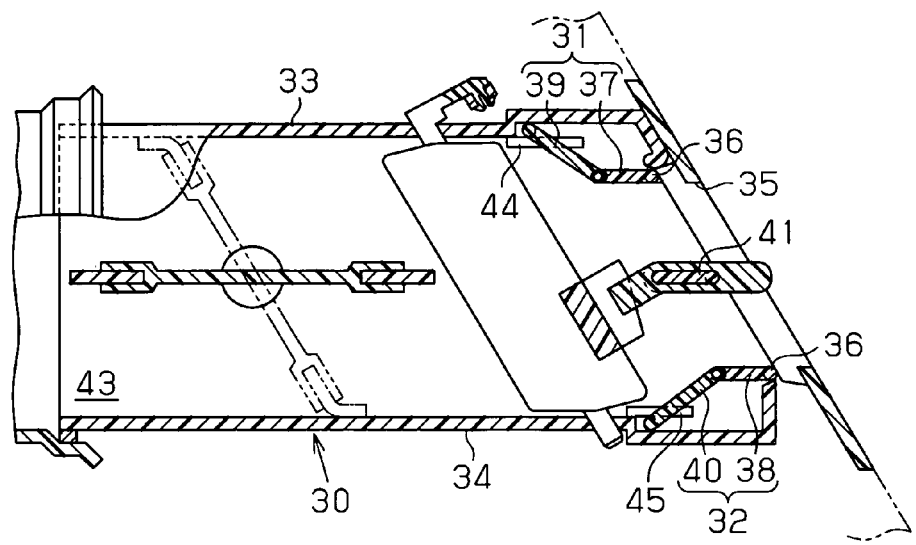
FIG. 19 is a cross-sectional view showing the low-profile air conditioning register disclosed in Japanese Laid-Open Patent Publication No. 2008-149830.
Figure 20A:
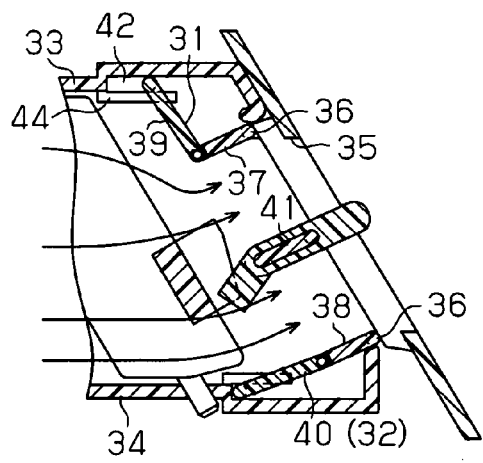
FIG. 20A is a cross-sectional view illustrating operation of the low-profile air conditioning register shown in FIG. 19 when the air is blown diagonally upward.
Figure 20B:
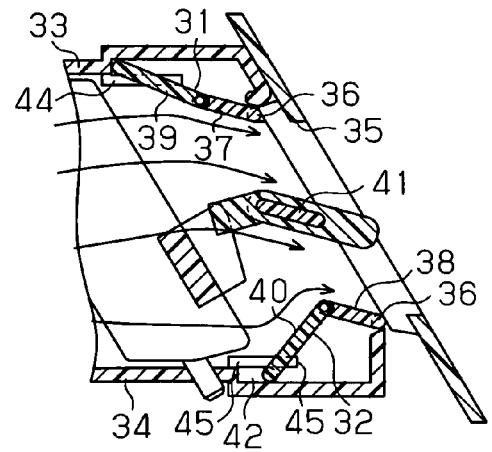
FIG. 20B is a cross-sectional view illustrating operation of the low-profile air conditioning register shown in FIG. 19 when the air is blown diagonally downward.

A fifth embodiment of the present invention will hereafter be described with reference to FIG. 18.

The fifth embodiment is the same as the fourth embodiment except that the ridges 6a, 6b face each other at the same position in the airflow direction TH of the air A as in the second embodiment illustrated in FIG. 15. The first fin 9 is arranged between the first inclined surfaces 7a, 7b and between the second inclined surfaces 8a, 8b. The pivot shaft 9a is located between the first inclined surfaces 7a, 7b.

Accordingly, the fifth embodiment achieves the same advantages as those of the second embodiment or the fourth embodiment.

The illustrated embodiments may be modified as follows.

In each of the illustrated embodiments, if the ornamental surface located around the air conditioning register faces downward as in a case in which the register is installed in the ceiling panel, the ridge 6a may be located at an upstream position in the airflow direction TH of the air A, and the ridge 6b may be arranged at a downstream position.

The air conditioning register 1 may be arranged in the portion of the instrument panel 12 at the side corresponding to the front passenger seat, instead of the upper portion of the center cluster.

The air conditioning register 1 may be arranged with the long sides 5a of the opening 5 oriented in the up-and-down direction.

A plurality of first fins 9 may be arranged and spaced apart at certain intervals. In this case, the first fins 9 must be connected together in such a manner that the angles of the first fins 9 with respect to horizontal planes are always the same.

The part corresponding to the ridge 6a, 6b of each inner wall surface 21 may be replaced by a curved surface. Specifically, the most part of the lower first inclined surface 7a and the most part of the second inclined surface 8a may be flat surfaces, and the boundary between the lower first inclined surface 7a and the second inclined surface 8a may be a curved surface. Further, the most part of the upper first inclined surface 7b and the most part of the second inclined surface 8b may be flat surfaces, and the boundary between the upper first inclined surface 7b and the second inclined surface 8b may be a curved surface.

In these cases, the angle between the flat surface portion of the first inclined surface 7a and a horizontal plane, the angle between the flat surface portion of the first inclined surface 7b and a horizontal plane, the angle between the flat surface portion of the second inclined surface 8a and a horizontal plane, and the angle between the flat surface portion of the second inclined surface 8b and a horizontal plane are defined as the angle K1, the angle K2, the angle K3, and the angle K4, respectively. The angles K1 to K4 are set in the respective aforementioned preferable ranges.

The invention claimed is:

1. An air conditioning register for blowing air into a passenger compartment through an opening of a retainer, the retainer comprising:
   a rectangular tubular body extending laterally and configured to direct airflow into the passenger compartment;
   an opening of the retainer being arranged at an end of the rectangular tubular body, the opening having a rectangular shape, and long sides of the opening being oriented in a direction in a width of the passenger compartment;
   a pair of first inclined surfaces that face each other on an inner surface of the retainer, the first inclined surfaces being continuous with the opening and inclined to widen toward the passenger compartment;
   a pair of second inclined surfaces that face each other at an upstream position from the first inclined surfaces, the second inclined surfaces being connected to the first inclined surfaces and inclined to narrow toward the opening of the retainer; and
   a single fin arranged in the retainer at an upstream position from the opening,
   wherein the two first inclined surfaces include a first upper inclined surface and a first lower inclined surface, the two second inclined surfaces include a second upper inclined surface and a second lower inclined surface, the first lower inclined surface and the second lower inclined surface are continuous with each other through a first ridge, and the first upper inclined surface and the second upper inclined surface are continuous with each other through a second ridge,
   wherein the second ridge is located upstream of the first ridge in the airflow direction,
   wherein an angle between the second upper inclined surface and a horizontal plane is defined as an angle K1 having a range of 16° to 25°,
      an angle between the first upper inclined surface and a horizontal plane is defined as an angle K2 that has a range of 25° to 30°,
      an angle between the second lower inclined surface and a horizontal plane is defined as an angle K3 that has a range of 20° to 30°, and
      an angle between the first lower inclined surface and a horizontal plane is defined as an angle K4 that has a range of 20° to 30°, and
   wherein the single fin is arranged in such a manner that an angle of the single fin with respect to a horizontal plane is adjusted between a first angular position at which the single fin is located along one of the two second inclined surfaces and a second angular position at which the single fin is located along another one of the second inclined surfaces, the single fin being configured to direct airflow upwardly when the angle of the single fin is adjusted to one of the first and second angular positions and to direct airflow downwardly when the angle of the single fin is adjusted to another one of the first and second angular positions.

2. The air conditioning register according to claim 1, wherein each first inclined surface and one of the second inclined surfaces that is located on the opposite side of the single fin from the first inclined surface are arranged parallel to each other.

3. The air conditioning register according to claim 1, wherein a pivot shaft for pivotally supporting the single fin is arranged between the first ridge and the second ridge in an airflow direction.

4. The air conditioning register according to claim 1, wherein a long side of the opening is oriented in a direction of the width of a vehicle.

5. The air conditioning register according to claim 1, wherein the single fin includes a downstream end that is pivotably supported by inner walls of the retainer, and the downstream end of the single fin is arranged between the first ridge and the second ridge.

6. The air conditioning register according to claim 5, further comprising additional fins located upstream from the single fin.

7. An air conditioning register for blowing air into a passenger compartment of a vehicle through an opening of a retainer, the retainer comprising:
   a rectangular tubular body extending laterally and configured to direct airflow into the passenger compartment;
   an opening arranged at an end of the tubular body, the opening having a rectangular shape, and long sides of the opening being oriented in a direction in a width of the passenger compartment;
   a pair of first inclined surfaces that face each other on an inner surface of the retainer, the first inclined surfaces being continuous with the opening and being inclined to widen toward the passenger compartment;
   a pair of second inclined surfaces that face each other at an upstream position from the first inclined surfaces, the second inclined surfaces respectively being connected to and forming a continuous surface with the first inclined surfaces, and the second inclined surfaces being inclined to narrow toward the opening of the retainer;
   a first ridge arranged along the continuous surface where the first lower inclined surface and the second lower inclined surface intersect;
   a second ridge arranged along the continuous surface where the first upper inclined surface and the second upper inclined surface intersect, the second ridge being located upstream of the first ridge in the airflow direction;
   the first lower, second lower, first upper and second upper inclined surfaces are configured to have angular relationships relative to a horizontal plane respectively intersecting each of the first lower, second lower, first upper and second upper inclined surfaces as follows:
      an angle K1 between the second upper inclined surface and the horizontal plane intersecting therewith is within a range of 16° to 25°, an angle K2 between the first upper inclined surface and the horizontal plane intersecting therewith is within a range of 25° to 0°, an angle K3 between the second lower inclined surface and the horizontal plane intersecting therewith is within a range of 20° to 30°, and an angle K4 between the first lower inclined surface and the horizontal plane intersecting therewith is within a range of 20° to 30°; and a single fin arranged between the first and second ridges of the retainer, the single fin pivoting at least from an upper airflow position through a horizontal position into a lower airflow position, in the upper airflow position the single fin is located along one of the two second inclined surfaces and in the lower airflow position the single fin is located along the other one of the second inclined surfaces; and the single fin is configured to direct airflow upwardly, horizontally, and downwardly into the passenger compartment when respectively pivoted to the upper airflow position, the horizontal position and the lower airflow position.

8. The air conditioning register according to claim 7, wherein the single fin includes a downstream end that is pivotably supported by inner walls of the retainer.

9. The air conditioning register according to claim 7, further comprising additional fins located upstream from the single fin.

10. The air conditioning register according to claim 7, wherein each first inclined surface and one of the second inclined surfaces that is located on the opposite side of the single fin from the first inclined surface are arranged parallel to each other.

11. The air conditioning register according to claim 7, wherein a pivot shaft for pivotally supporting the single fin is arranged between the first ridge and the second ridge in the airflow direction.

12. The air conditioning register according to claim 7, wherein the single fin is parallel to one of the two second inclined surfaces when in the upper airflow position and parallel to another one of the two second inclined surfaces when in the lower airflow position.

* * * * *